United States Patent
Morin

(10) Patent No.: US 8,972,119 B2
(45) Date of Patent: Mar. 3, 2015

(54) SYSTEM AND METHOD FOR HEAVY EQUIPMENT NAVIGATION AND WORKING EDGE POSITIONING

(71) Applicant: NovAtel Inc., Calgary (CA)

(72) Inventor: Kristian Morin, Calgary (CA)

(*) Notice: Subject to any disclaimer, the term of this patent is extended or adjusted under 35 U.S.C. 154(b) by 0 days.

(21) Appl. No.: 13/833,508

(22) Filed: Mar. 15, 2013

(65) Prior Publication Data

US 2014/0277956 A1   Sep. 18, 2014

(51) Int. Cl.
G01C 21/26   (2006.01)
G01S 19/14   (2010.01)

(52) U.S. Cl.
USPC ............................................ 701/50; 705/7.12

(58) Field of Classification Search
USPC .................... 701/50, 36, 1; 705/7.12, 306
See application file for complete search history.

(56) References Cited

U.S. PATENT DOCUMENTS

| 5,612,864 | A  | * | 3/1997  | Henderson ....................... 700/59 |
| 5,996,702 | A  | * | 12/1999 | Hall .................................. 172/4.5 |
| 6,389,785 | B1 | * | 5/2002  | Diekhans et al. ............ 56/10.2 F |
| 6,721,657 | B2 |   | 4/2004  | Ford et al. |
| 7,139,662 | B2 | * | 11/2006 | Ericsson et al. ................ 701/50 |
| 8,478,492 | B2 | * | 7/2013  | Taylor et al. ..................... 701/50 |
| 2008/0109141 | A1 |   | 5/2008 | Nichols et al. |
| 2010/0121540 | A1 | * | 5/2010 | Kumagai et al. ................ 701/50 |
| 2012/0130602 | A1 | * | 5/2012 | Omelchenko et al. .......... 701/50 |
| 2012/0239258 | A1 | * | 9/2012 | Konno et al. .................... 701/50 |
| 2012/0263566 | A1 |   | 10/2012 | Taylor et al. |
| 2012/0296529 | A1 | * | 11/2012 | Peake et al. ..................... 701/50 |

FOREIGN PATENT DOCUMENTS

WO   WO-0186078 A1   11/2001

OTHER PUBLICATIONS

Ford, et al., "OEM4 Inertial: A Tightly Integrated Decentralized Inertial/GPS Navigation System", *14th International Technical Meeting of the Satellite Division of the Institute of Navigation in Salt Lake City*, Sep. 2001, (11 pages).
PCT Notification of Transmittal of the International Search Report and the Written Opinion of the International Searching Authority, or the Declaration, International Searching Authority, International Application No. PCT/CA2014/050152, mailed May 12, 2014, 9 pages.

* cited by examiner

*Primary Examiner* — Tan Q Nguyen
(74) *Attorney, Agent, or Firm* — Cesari and McKenna, LLP

(57) ABSTRACT

A system and method for automatically controlling working edges on a heavy equipment vehicle is provided. A GNSS/INS system determines a location of the vehicle. A vision system calculates a location of the working edge in a vision system coordinate system by obtaining images of a target connected to the working edge using a camera with a fixed field view that incorporates the relative movement of the target and determining the relative position of the target in the images. The location is then transformed to the navigation system coordinate system. The transformed location information is used by a working edge control system to control the placement of the working edge.

12 Claims, 7 Drawing Sheets

SYSTEM AND METHOD FOR HEAVY EQUIPMENT NAVIGATION AND WORKING EDGE POSITIONING

BACKGROUND OF THE INVENTION

1. Field of the Invention

The present invention relates generally to GNSS/INS systems and more particularly to GNSS/INS systems utilized for heavy equipment navigation and working edge positioning.

2. Background Information

Heavy equipment vehicles typically have one or more working edges (e.g., blades) that are utilized to perform specific functions. Examples of heavy equipment includes, e.g., bulldozers, graders, front end loaders, back hoes, etc. As used herein, the term working edge refers generally to any component of heavy equipment that performs a specific function in which precise positioning may be necessary. Examples of working edges may include the blade of a bulldozer or grader, the scoop of a backhoe, etc.

During normal operation, the driver of the heavy equipment will utilize the working edge to perform some function, e.g., using the blade of a bulldozer to level a section of land to a predetermined grade. The work is typically checked manually during operation to ensure that it has been completed in accordance with a pre-defined specification. For example, a bulldozer operator may level the section of land, but separate checks are needed to verify that it is at the desired grade, width, etc. This may result in an iterative process of performing work and then taking measurements, with the measurements being used for the next round of work until the desired outcome has been achieved. That is, the heavy equipment may perform an operation, e.g., grade a section of land. After grading, a team of surveyors and/or engineers must then manually verify that the grade correct, etc. If there are errors, then the heavy equipment must perform a second pass before a second set of measurements are taken, etc.

Recently, various manufacturers have produced automatic working edge positioning systems for use with heavy equipment machinery. Automatic working edge positioning systems are designed to enable productivity gains by precisely guiding the operator while working. Generally, an automatic working edge positioning system controls the positioning of the working edge during operation so that the desired work is performed in an automated manner. This typically results in a reduction in the number of work-measurements iterations required to complete a project. By automating working edge positioning, productivity is typically increased by reducing the number of work stoppages for surveying, etc. Instead, with an automated working edge positioning system, work may be conducted in a more efficient manner.

In a conventional heavy equipment working edge control system, one or more sensors are affixed to the working edge to monitor its location and/or orientation with respect to a fixed point of the heavy equipment vehicle. Illustratively, this working edge position information is relayed, via one or more cables, to a control system that is located within the cab of the vehicle. Typically, the heavy equipment vehicle will include a global navigation satellite system (GNSS) that provides accurate location of the machine. This location information, in conjunction with the relayed blade position, is utilized by the working edge control system to accurately grade and/or level the workspace.

One noted disadvantage of conventional heavy equipment working edge control systems is that the delicate sensors are mounted on the working edge and are therefore subject to being damaged during normal operation of the machine. This increased chance of damage is the result of being located in a very stressful work environment. As will be appreciated by one skilled in the art, the working edge of a heavy equipment machine undergoes numerous stresses during operation. These stresses may be the result of dirt or other material striking the sensors, thereby damaging them or knocking them out of alignment and/or calibration.

The damage of sensors due to the stressful work environment in which they are located reduces the effectiveness of automatic working edge control systems. In response to the damage of a sensor, work must be stopped and the sensor replaced and/or repaired. Thus, the expected reduction of inefficiencies through the use of an automated working edge control system are lost due to the down time spent in repairing/replacing sensors.

SUMMARY OF THE INVENTION

The disadvantages of the prior art are overcome by providing a novel GNSS/INS system that provides location information for the heavy equipment machine. A vision system is utilized to obtain working edge location information by acquiring images of via an image capture device. The location information is computed by the vision system in vision system coordinate system. The working edge location information is then transformed into a coordinate system associated with the GNSS/INS system. The transformed working edge location information may then be utilized by a working edge control system.

During operation, the GNSS/INS system provides accurate location and navigation information related to the location of the heavy equipment vehicle. Illustratively, an image acquisition device, such as a camera, which is mounted on the vehicle with a fixed field of view of the spatial region within which a target that is affixed at a predetermined location on the working edge may move, acquires an image that includes the target. The vision system first identifies the target within the acquired image and then calculates the location of the target in a vision system coordinate system, i.e., the location and orientation of the target and thus the working edge in terms of an X,Y,Z location and/or rotation based on a coordinate system centered on the vision system.

During a configuration/calibration operation prior to use, a known transformation is defined between the coordinate system associated with the vision system and the coordinate system utilized by the GNSS/INS navigation system. Once the location information is obtained for the working edge in the vision system coordinate system based on the location of the target within the image, the predefined transformation is applied to generate the location of the working edge in terms of the navigation system's coordinate system. This information may then be output to an automated working edge control system for use in accurately grading and/or performing other operations.

BRIEF DESCRIPTION OF THE DRAWINGS

The above and further advantages of the present invention are explained in relation to the following figures in which like reference numerals indicate similar functional or structural components, of which.

DETAILED DESCRIPTION OF AN ILLUSTRATIVE EMBODIMENT

Heavy Equipment and Working Edges

Figure 1:
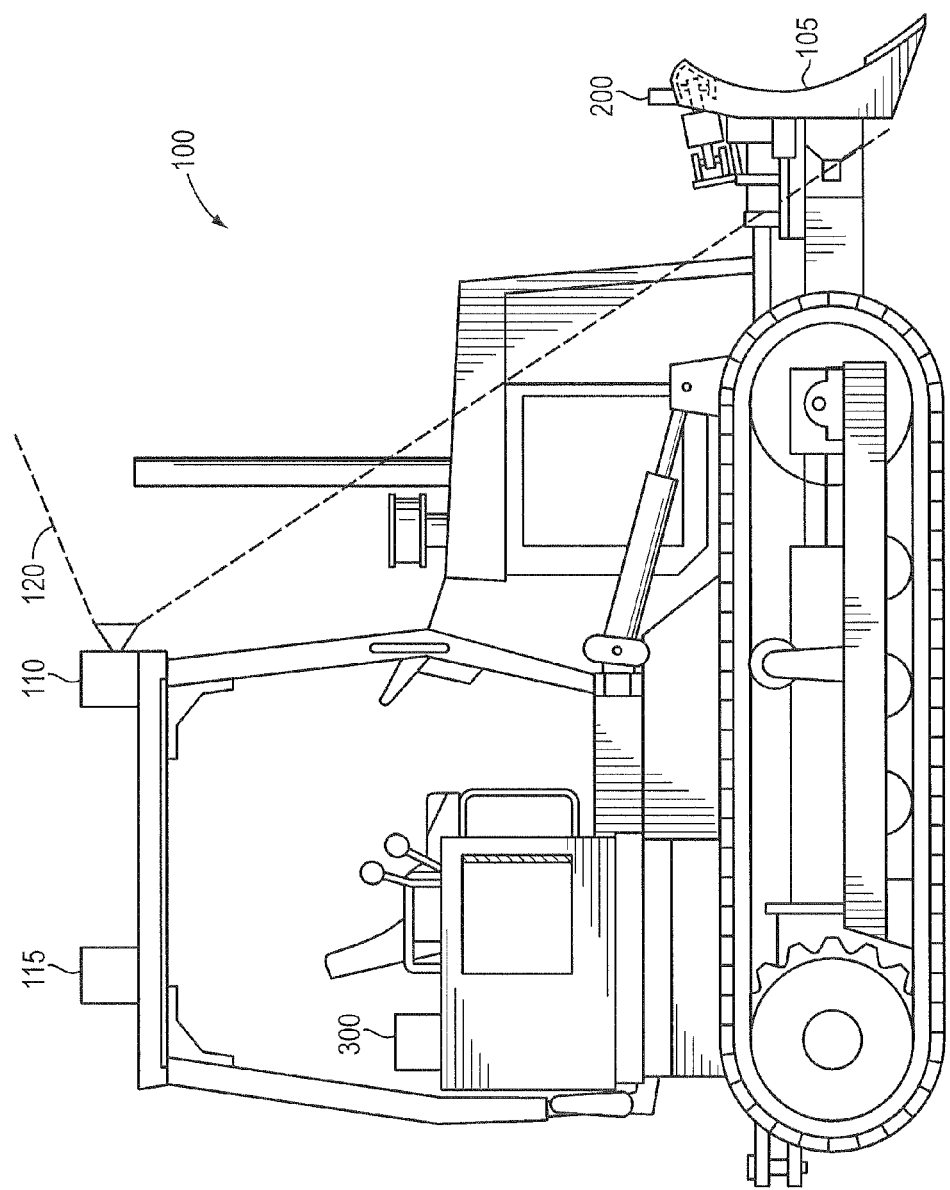
FIG. 1. is a side view of an exemplary heavy equipment vehicle that may be utilized in an illustrative embodiment of the present invention.

FIG. 1 is a side view of an exemplary heavy equipment vehicle 100, e.g., a bulldozer, in which the principles of the present invention may be utilized in accordance with an illustrative embodiment of the present invention. The bulldozer 100 illustratively comprises a working edge, e.g., blade 105. Further, the bulldozer 100 includes an image acquisition device 110 mounted thereon that is configured to obtain images of a target 200 that is operatively interconnected/affixed to the blade 105. The image acquisition device 110 includes a fixed field of view 120 that includes the spatial region within which the target 200 may move during operation of the working edge 105. Further, the bulldozer comprises an antenna 115 that is configured to receive GNSS signals for use by a navigation system 300, described further below in reference to FIG. 3.

It should be noted that while the description contained herein refers to a bulldozer 100 having a blade 105, it is expressly contemplated that the principles of the present invention may be utilized with any type of heavy equipment vehicle having any form of working edge. As such, the description of a bulldozer having a blade should be taken as exemplary only. Furthermore, as will be appreciated by those skilled in the art, the principles of the present invention may be expanded to encompass those machines having a plurality of work surfaces, for example a machine having both a front end loader and a back hoe. In such embodiments, a plurality of targets 105 and/or image acquisition devices 110 may be utilized. In one such embodiment, each work surface will be associated with one or more targets 105 and image acquisition devices 110. For example, a first target may be on the blade of the bulldozer with a first image acquisition device 110 focused thereon. A second target may be affixed to the backhoe with a second image acquisition device 110 focused thereon. However, in alternative embodiments, a single image acquisition device 110 may be utilized if it is able to acquire images of the plurality of targets. In a further alternative embodiment, a plurality of targets 200 may be utilized on a single work surface 105. A plurality of targets may be utilized to improve accuracy, to avoid blind spots due to the profile of the machine, etc. As such, the description contained herein should be taken as exemplary only and should not be construed as limiting as to possible alternative embodiments that may achieve the desired principles of the present invention.

Figure 2:
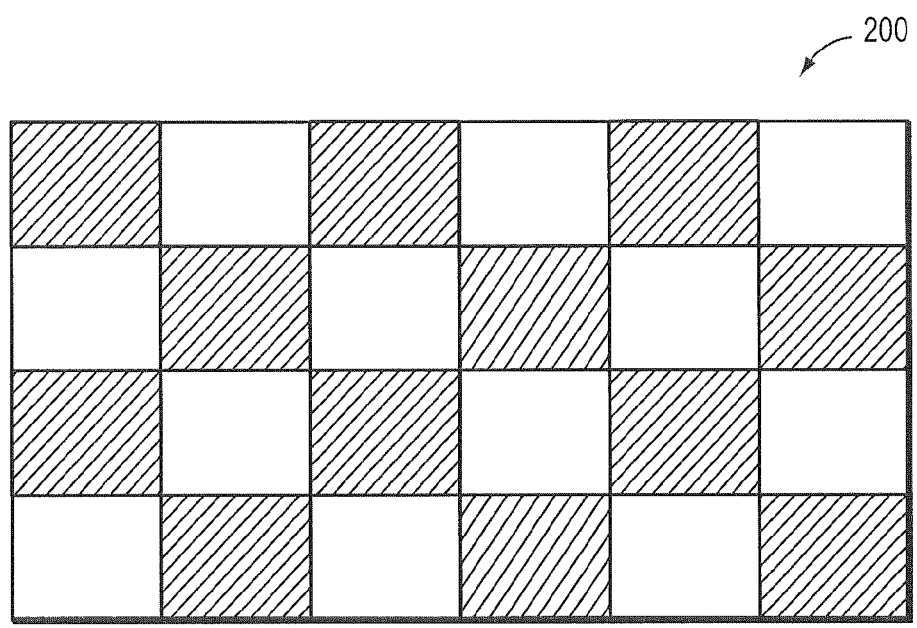
FIG. 2 is a schematic diagram of an exemplary target that may be utilized on a working edge in accordance with an illustrative embodiment of the present invention.

FIG. 2 is a stylized diagram of an exemplary target 200 that may be utilized in accordance with an illustrative embodiment of the present invention. Illustratively, the target 200 comprises a checkerboard pattern of alternating light and dark squares of a predefined size. However, it should be noted that in alternative embodiments, additional and/or differing patterns may be utilized to achieve the desired effect. The target 200 is utilized by the image acquisition device and associated processing to determine location information of the work surface 105 in relation to the image acquisition device 110. As used herein, the term location information refers to an X, Y, Z location in a coordinate space centered on the image acquisition device. Further, the location information may comprise one or more rotational values for the working edge 105 along any of the axes.

Illustratively, the target 200 is operatively connected to the working edge 105 at a predetermined position relative to, for example, a given corner of the working edge. In one exemplary embodiment, the target may be painted on or otherwise applied to the side of the working edge that faces the image acquisition device 110 at a known location relative to the top left corner of the working edge in the images. There is thus a predefined spatial relationship between the location of the target and a predefined point on the working edge. For example, if a target is located on the top left corner of the back side of a bulldozer blade, then there is a predefined (X,Y,Z) relationship between the location of the target and a predefined point, e.g., the center of the bottom edge of the blade. Thus, by knowing the location of the target, the location of a particular point on the working edge may be quickly determined by the predefined spatial relationship.

GNSS/INS System

The heavy equipment vehicle illustratively utilizes a GNSS/INS system 300 that provides location information regarding the heavy equipment. In alternative embodiments, a GNSS only or INS only system may be utilized. As such, the description of a GNSS/INS system should be taken as exemplary only. One exemplary GNSS/INS system is described in U.S. Pat. No. 6,721,657, entitled INERTIAL GNSS NAVIGATION SYSTEM, by Thomas Ford, et al, issued on Apr. 13, 2004, the contents of which are hereby incorporated by reference.

Figure 3:
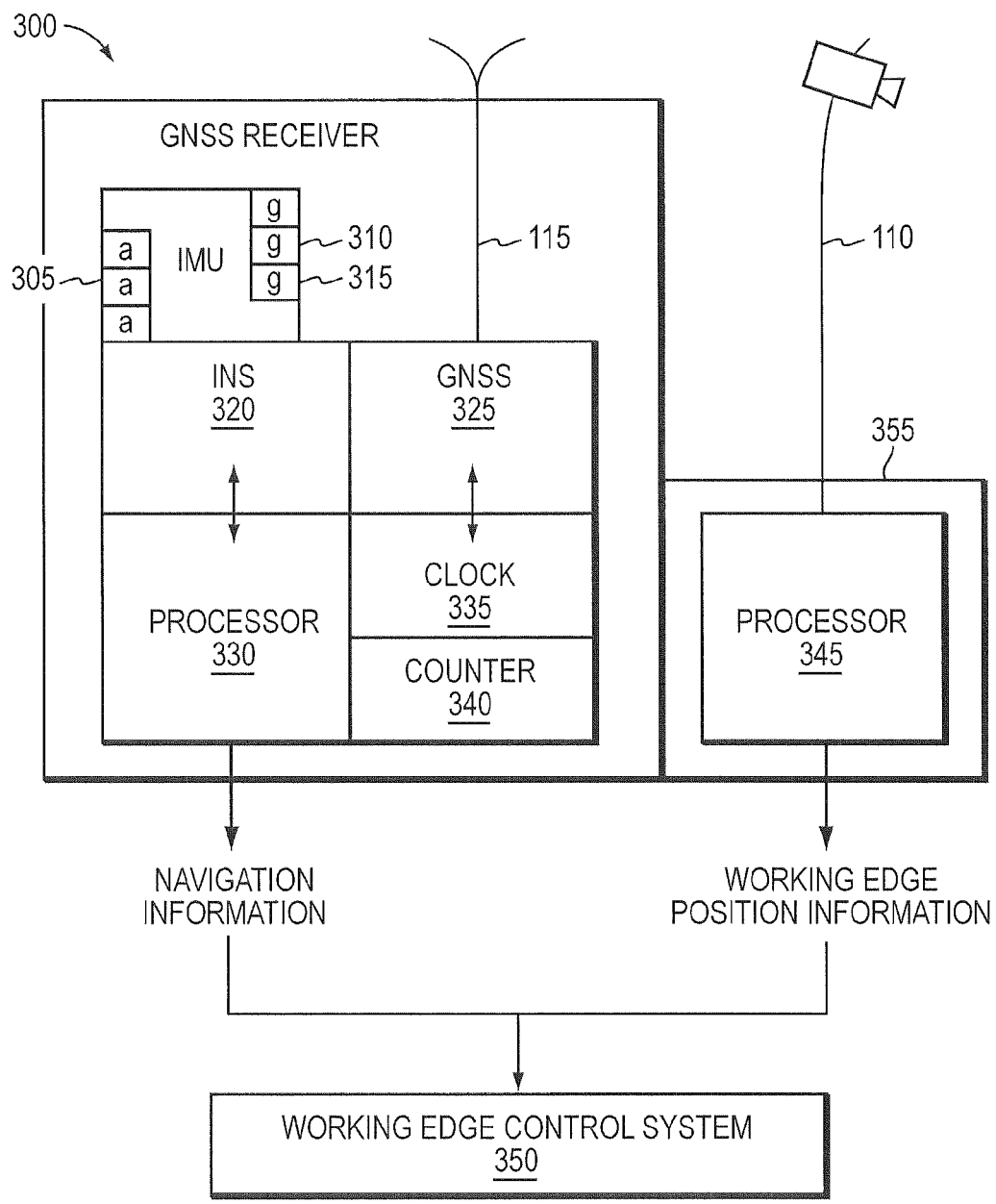
FIG. 3 is a functional block diagram of a GNSS/INS navigation system and vision system that may be utilized in accordance with an illustrative embodiment of the present invention.

FIG. 3 is a schematic block diagram of an exemplary navigation system, illustratively embodied as a GNSS/INS system 300, and vision system 355 in accordance with an illustrative embodiment of the present invention. The GNSS/INS system 300 includes an INS sub-system 320 and a GNSS sub-system 325 that operate under the control of a processor 330, to calculate GNSS position and INS position, velocity and attitude information. The GNSS subsystem processes the satellites signals received over the antenna 115. The INS subsystem receives measurements from an inertial measuring unit ("IMU") 315 that reads data from orthogonally positioned accelerometers 305 and gyroscopes 310. The data from the IMU is time tagged by a counter 340 that is slaved to a GNSS-time clock 335. The two sub-systems can thus reliably interchange position-related information that is synchronized in time. The two subsystems operate together, through software integration in the processor 330, to provide position-related information between the subsystems.

For ease of understanding, the description of the processing operations of the two sub-systems are made without specific reference to the processor 330. The system may instead include dedicated GNSS and INS sub-processors that communicate with one another at appropriate times to exchange information that is required to perform the various GNSS and INS calculation operations discussed below. For example, the INS sub-processor communicates with the GNSS processor when IMU data is provided to the sub-processor, in order to time-tag the data with GNSS time. Further, the GNSS sub-processor communicates with the INS sub-processor to provide GNSS position information at the start of each measurement interval, and so forth.

At start-up, the GNSS sub-system 325 operates in a known manner to acquire the signals from at least a minimum number of GNSS satellites and calculate pseudoranges to the respective satellites and associated Doppler rates. Based on the pseudoranges, the GNSS sub-system determines its position relative to the satellites. The GNSS sub-system may also determine its position relative to a fixed-position base receiver (not shown), either through the use of differential correction measurements generated at the base station or after resolving associated carrier cycle ambiguities.

Figure 6:
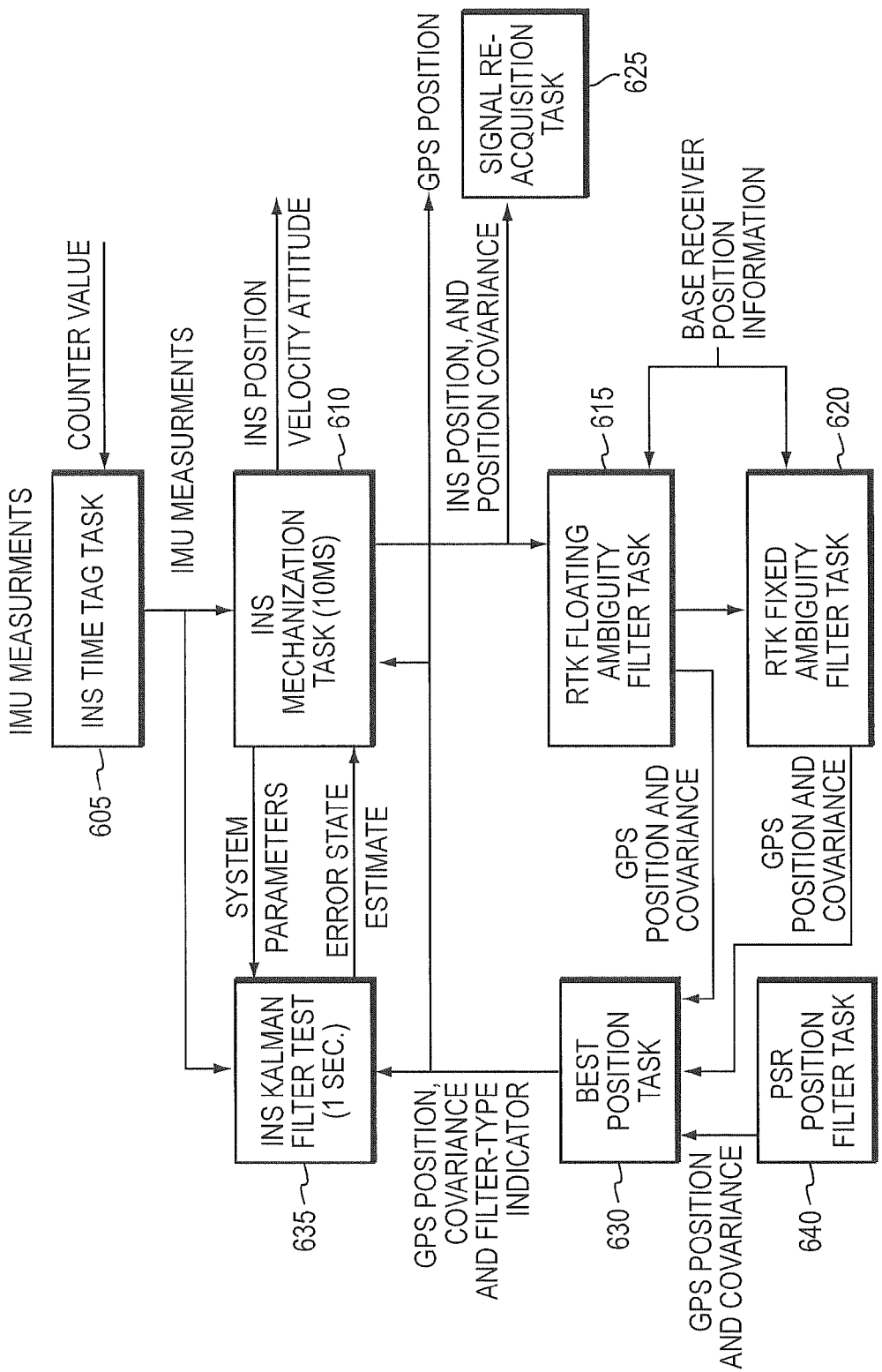
FIG. 6 is a functional block diagram of a GNSS/INS system that may be utilized in accordance with an illustrative embodiment of the present invention.

At the same time, the INS sub-system 320 processes the IMU data, that is, the measurements from the various accelerometers 305 and gyroscopes 310, to determine the initial attitude and velocity of the receiver. The INS sub-system further processes both the IMU data and the GNSS position and associated covariance information to set up various matrices for an INS Kalman filter (FIG. 6). At the start of each measurement interval, the INS sub-system updates the Kalman filter and provides updated error states to a mechanization process. The mechanization process uses the updated information and the IMU data to propagate, over the measurement interval, the inertial position, attitude and velocity, with the inertial position and other system element errors being controlled with GNSS positions at the start of the measurement interval.

Figure 4:
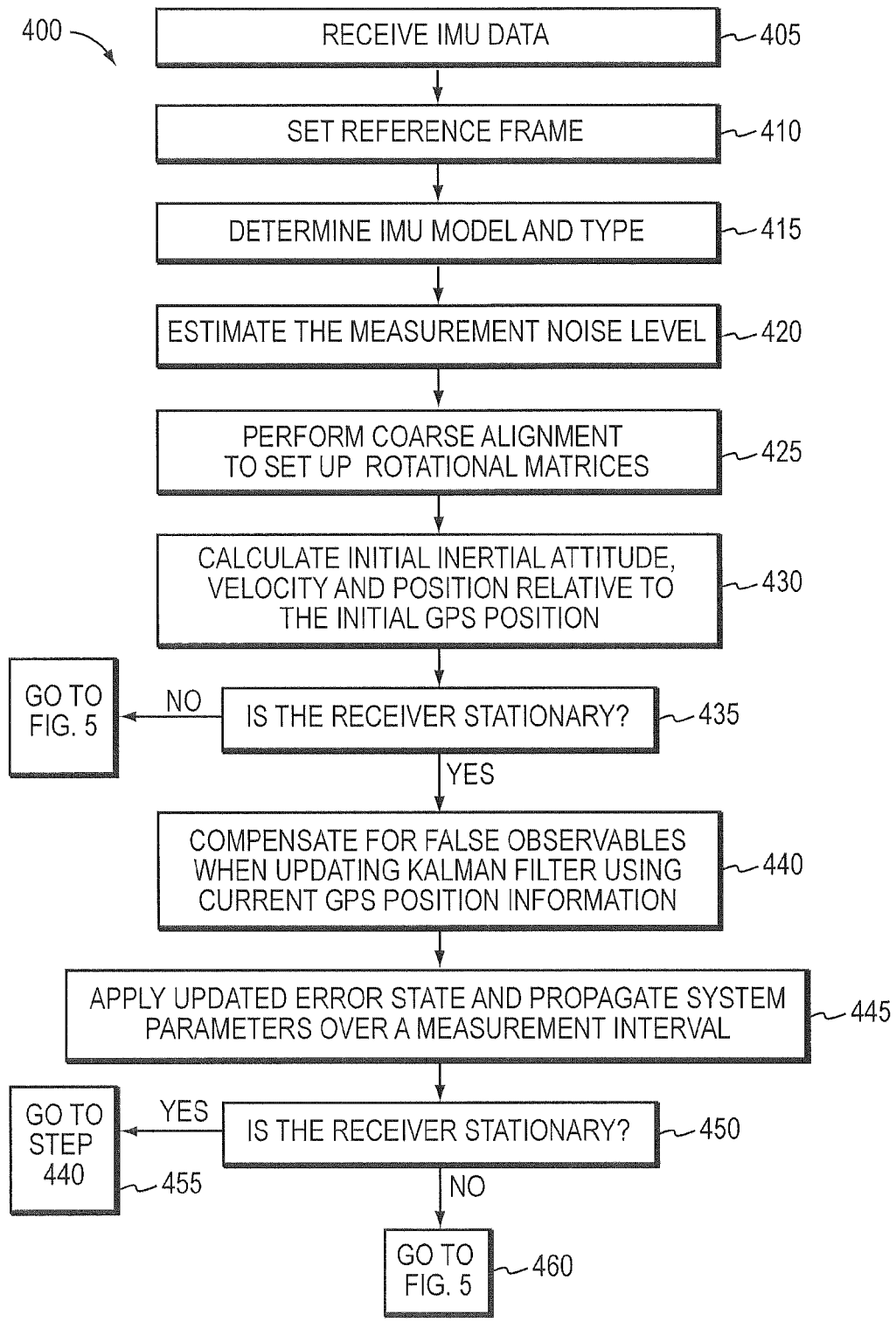
FIG. 4 is a flow chart detailing the steps of inertial navigation system start-up processing in accordance with an illustrative embodiment of the present invention.

Referring now also to FIG. 4, at start-up the system 300 is presumed to be at rest, and the INS sub-system 320 determines the orientation of a reference, or body, frame for the accelerometer and gyroscope measurements. To set the orientation of the reference frame, the INS sub-system 320 compares the measurements from the various accelerometers, which are nominally assigned to X, Y and Z axes, to determine which measurement is largest in magnitude. The INS sub-system then re-assigns or maps the X, Y and Z axes among the accelerometers such that the Z-axis has the largest positive acceleration magnitude, that is, such that the Z-axis points up. The INS sub-system will then properly estimate the initial attitude, regardless of how the receiver is oriented.

The IMU 315 plugs into a port (not shown) of the processor 330 and through the port supplies accelerometer and gyroscope measurement data to the processor. The IMU may be selected from a number of models and/or types, each associated with a different scaling factor and nominal accelerometer and gyroscope bias levels. The user may select a particular IMU model for navigation operations based on price and/or on the particular characteristics of the IMU.

At start-up, the INS sub-system must thus determine which IMU is connected to the processor 330 (step 415), in order to ensure that the IMU measurements are scaled correctly, and also to assign initial uncertainties to the attitude calculations. The INS sub-system tests for a particular IMU by determining the scale factor associated with the accelerator measurements. The process thus compares a ratio of the magnitude of the normal gravity vector and the length of the scaled acceleration vector with stored ratios associated with the various IMU scale factors and selects the appropriate model/type.

At essentially the same time, the INS sub-system estimates the noise level on the IMU measurements (step 420) based on the standard deviation of the measured accelerometer signals. If the receiver moves before the noise level estimation is completed, the process uses as the estimate the nominal noise level value specified by the IMU manufacturer.

The INS sub-system 320 begins a coarse alignment process (step 425). The coarse alignment process sets up various rotational matrices that are used to transform measurement data to a computational frame, which in the example is the earth centered earth fixed frame or ECEF frame. The coarse alignment process is based on an assumed "local" position of the receiver, which is the initial GNSS position provided by the GNSS sub-system 325. The INS subsystem specifies three orthogonal vectors that are associated with the local position, namely, the gravity vector, the earth angular velocity vector, and the cross product of the two vectors. The INS sub-system then determines the same vectors and their cross product transformed to the reference, or body, frame, based on the measurements of the accelerometers 305 and gyroscopes 310. The INS sub-system 320 uses the estimated noise level determined in step 420 in calculating the initial attitude and velocity. The INS sub-system also calculates an inertial position relative to the initial GNSS position (step 430).

As part of the coarse alignment, the attitude accuracy and INS measurement noise level is computed. After coarse alignment, the INS sub-system operates in navigation mode to propagate the inertial system parameters of position, velocity, attitude and bias estimates. The propagation involves a Kalman filter process and a mechanization process. The Kalman filter process essentially updates system error and variance covariance information and propagates the variance covariance information, and the mechanization process uses the updated information in the propagation of the inertial system parameters of position, velocity, attitude.

A generic Kalman filter process estimates a series of parameters that describe and predict the behavior of a system. The Kalman filter operates with a set of state variables that describe errors in the system and an associated variance covariance matrix that describes the current knowledge level of the state. The Kalman filter maintains an optimal estimate of the system errors and associated covariance over time and in the presence of external measurements through the use of propagation and updating processes.

To propagate the state and its covariance from some past time to the current time, the Kalman filter propagation step uses knowledge of the state dynamic behavior determined from the physics of the system and the stochastic characteristics of the system over time. The Kalman filter update step thus uses the linear relationship between the state and observation vectors in conjunction with the covariance matrices related to those vectors to determine corrections to both the state vector and the state covariance matrix.

The INS Kalman filter relates observational data, i.e., IMU data and GNSS data, to various elements in the state based on a functional relationship that is modeled as a linear relationship. The state vector is initially set to the zero vector because any error estimates are initially applied to the system parameters of position, velocity, attitude, and also to bias terms, as discussed below.

Illustratively, the level of noise on the IMU measurements is a source of error, and it must thus be taken into account in the INS Kalman filter. The velocity and attitude states are modeled as random walks and the basic process noise values applied to these is a function of the noise levels on the accelerometers and gyroscope measurements, respectively. But accelerometer and gyroscope scaling errors are not modeled as states in the system, and so they also will contribute to the uncertainty of the velocity and attitude states in the presence of acceleration and system rotation.

In the case of the accelerometers it is not possible to distinguish the scaling and bias errors while the system is stationary. Therefore, in the presence of gravity, the vertical axis accelerometer bias becomes observable but part of the bias error is the result of the associated scaling error. Accordingly during initialization, the system retains the average specific forces measured while the first estimates of the accelerometer biases are made. Later, when the system starts to move, the specific forces measured by the accelerometers are differenced from the initial specific forces.

If a determination is made that the receiver is stationary at the start of the navigation mode (step 435), the INS sub-system performs a process to reduce the effect noise-induced "false observables" (steps 440, 445). Due to accelerometer and gyroscope biases and noise on the measurements, the INS sub-system measurements indicate that the receiver is moving.

Figure 5:
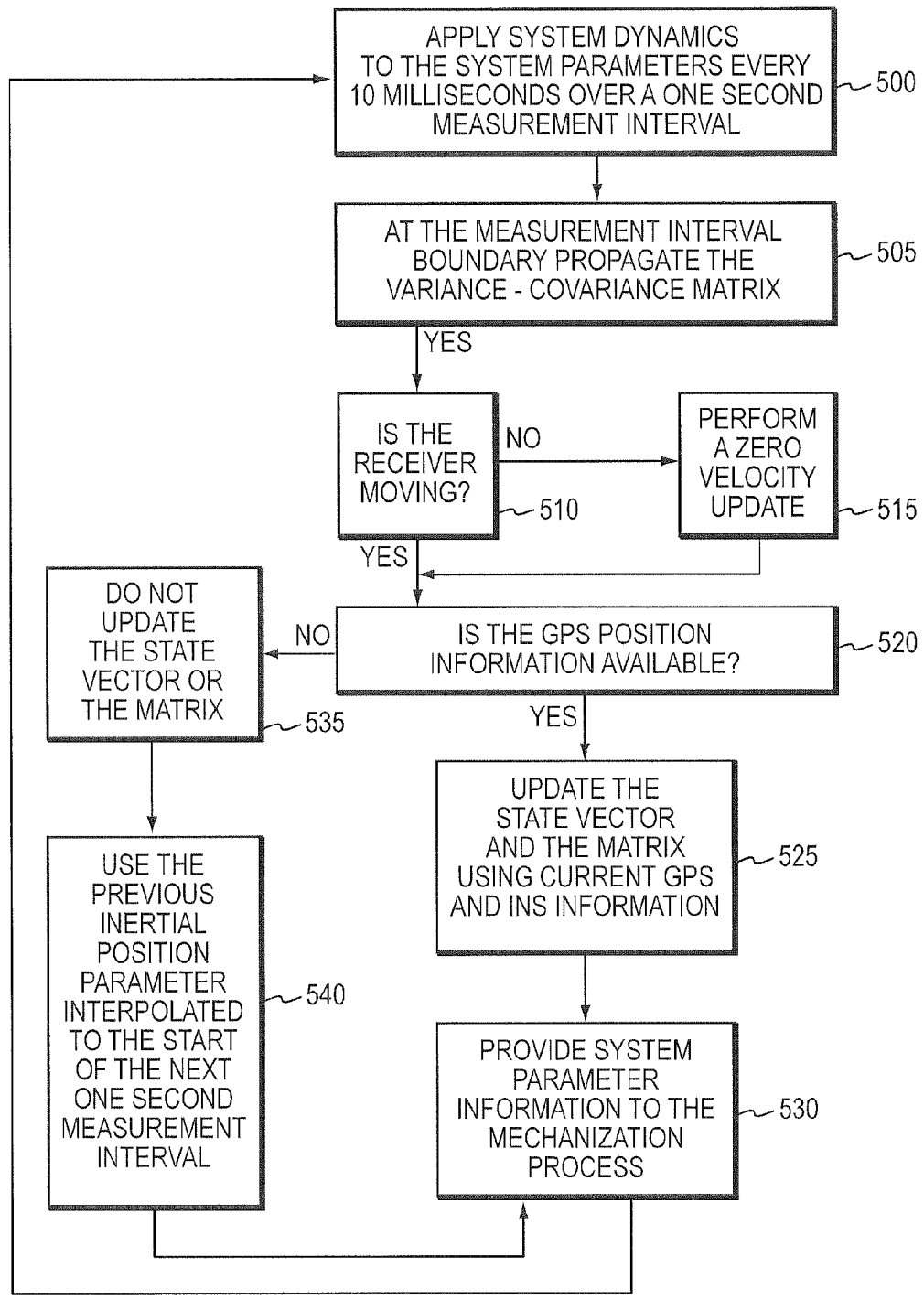
FIG. 5 is a flow chart detailing the steps of inertial navigation system steady state processing in accordance with an illustrative embodiment of the present invention.

Referring now to FIG. 5, once the receiver starts to move, the INS sub-system 320 operates in steady-state navigation mode. In step 500, the inertial position, velocity and altitude are propagated over a one second measurement interval with the receiver dynamics applied every ten milliseconds. At the one second mark, the INS Kalman filter propagates a covariance matrix. The INS sub-system then determines its inertial position at the one second boundary, interpolating as necessary. At the same time the INS sub-system determines if the receiver is moving, and if not the receiver performs a zero-velocity update. Otherwise, the INS system waits for the GNSS position corresponding to the 1 second mark, assuming the receiver has a sufficient number of the GNSS satellites then available to it. Once the GNSS position information is supplied by the GNSS sub-system, the INS Kalman filter process performs a position update using the INS measurements and system parameters. Otherwise, the Kalman filter does not perform a position update. Thereafter, the Kalman filter provides the error state information, updates as appropriate, to the mechanization process which again applies the system dynamics to the system parameters.

For a zero velocity update to occur, the difference between the magnitudes of an averaged measured acceleration vector and the gravity vector has to be within a predetermined threshold range, and also the magnitude of an averaged measured angular rate vector has to be below a predetermined threshold. The velocity update to the Kalman filter for a zero velocity update uses an observation covariance matrix that is based on the thresholds used to detect the stationary condition. At the same time the Kalman filter uses GNSS position to update the state, but since the system is stationary, the GNSS position is de-weighted nine out of ten times unless the position is based on fixed integer ambiguities. This deweighting prevents an inordinate reduction of the state variances as a result of the correlated measurement noise that occurs on the GNSS measurements when the system is stationary.

Illustratively, if the GNSS position information is not available and the receiver is moving, the INS Kalman filter does not perform an update (step 535). The propagated covariance matrix then reflects that no GNSS position is available. The interpolated inertial position is used as the receiver position at the start of the next one second measurement cycle (step 540).

If the GNSS position information is not available and the receiver is moving, the INS Kalman filter does not perform an update (step 535). The propagated covariance matrix then reflects that no GNSS position is available. The interpolated inertial position is used as the receiver position at the start of the next one second measurement cycle (step 540). If, however, the receiver is stationary, the INS Kalman filter performs a zero velocity update but no position update, (step 540) and again uses the interpolated inertial position as the receiver position, (step 540).

As discussed below, the Kalman filter process may de-weight certain observation covariance information associated with certain observation times when, for example, particular GNSS filters are used to determine GNSS position, whether or not the receiver is stationary. The de-weighting is similarly used to compensate for time correlated measurement noise.

In many environments, for example, urban canyons, the receiver may experience severe multipath errors. To prevent the GNSS positions generated in these environments from corrupting the inertial system parameters via the Kalman filter update, the INS sub-system places a six sigma bound on the information before the information is used to update the Kalman filter.

The mechanization process (step 515) combines the initial conditions determined during course alignment with the IMU data, to keep the INS sub-system parameters current. Thereafter, the mechanization process uses the conditions associated with the ending boundary of the previous measurement interval, and propagates the INS sub-system parameters, that is, position, velocity and attitude, from the end boundary of the previous measurement interval to the end boundary of the current measurement interval.

The mechanization process applies receiver dynamics to the INS sub-system parameters once every 10 milliseconds. The inertial position is determined relative to the GNSS position at the beginning of each GNSS second. As GNSS positions become available at the even GNSS second, the Kalman filter process provides updated error states to the mechanization process, and the mechanization process uses the information in the calculations to propagate the system parameters over the measurement interval. The updated information serves to control the inertial system error growth.

Referring now to FIG. 6, the operations of the GNSS/INS receiver are described by way of an example that consists of an IMU and a NovAtel OEM4 dual frequency GNSS receiver with software that has been modified such that the GNSS processor can process the GNSS and inertial measurements using respective GNSS and INS filters. The OEM4 can provide L1 and L2 range and carrier measurements, as well as single point, pseudorange differential and carrier-based differential GNSS positioning. The GNSS sub-system thus includes three GNSS filters, namely, a PSR position filter 640 which is a pseudorange least squares position estimator that can operate in either single point or differential mode, a pseudorange/carrier RTK floating ambiguity filter 615 and a carrier-based RTK fixed ambiguity filter 620. A fourth filter, that provides low latency positions computed from the current local carrier measurements, predicted base station measurements and the best available ambiguities, is also part of the system, but is not material to the INS/GNSS integration, so is mentioned here only in passing. The respective filters have different error characteristics, and are thus associated with different covariance matrices.

The position and covariance information from each GNSS filter are provided to a best-position task 630, which selects a best position based on a minimum covariance trace. The process provides the selected position and associated covariance information and a filter-type indicator to the INS Kalman filter task 635. The GNSS position information is also included in the navigation information that is provided to the user.

As discussed above, the Kalman filter task 635 de-weights a proportion of the covariance matrices provided by the GNSS sub-system when the system is stationary and/or when particular GNSS filters are used to determine the GNSS position. Specifically, the Kalman filter process de-weights the covariance matrix 9 out of 10 GNSS observation times when the receiver is stationary and the GNSS position was generated in the pseudo-range (PSR) position filter 640 or, whether the system is stationary or not, and the position was generated in the floating ambiguity filter 615. Otherwise, the Kalman filter process uses the GNSS covariance matrix directly for the updating.

For the INS processing the measurements from the IMU are provided to an IMU task that sends a high priority interrupt to the controller (not shown) on the processor 330 (FIG. 3), and the controller responds by reading the count of a counter 340 that is slaved to GNSS time. The counter is accurate to 1 microsecond, while the GNSS time is accurate to 100 nanoseconds. The controller uses the count to reconstruct GNSS time, and the IMU task time tags the inertial measurements with the reconstructed GNSS time. The inertial position based on the data is thus time synchronized to a GNSS position at the microsecond level.

As discussed above, a mechanization task 610 processes the IMU data to propagate inertial position, attitude and velocity every 10 milliseconds in accordance with the receiver dynamics. At the 1 second boundaries, the inertial position and velocity with their associated covariance information, which are interpolated to the one second boundary, are sent by the mechanization process to the INS Kalman 635, a signal re-acquisition task 625 and the GNSS RTK floating point ambiguity filter 615. The INS Kalman filter uses this information in addition to GNSS position and covariance collected at the same time for updating. The GNSS filter 615 uses the information to perform integrity checks or, as appropriate, to aid in ambiguity resolution operations, and the signal re-acquisition task uses the information, as appropriate, to aid in signal re-acquisition tasks.

At the measurement interval boundaries, the Kalman filter task 635 provides error states updated or not as discussed above, to the mechanization task 610. The mechanization task includes the error state information in its propagation calculations for that measurement interval. The mechanization task also provides various propagated system parameters to the user as part of the navigation information, as discussed above.

At times when a sufficient number of satellites are not available to the receiver, the receiver omits the GNSS position in the navigation information. At the same time, the GNSS sub-system uses the inertial position, velocity and covariance information to re-acquire the satellite signals.

The signal re-acquisition task 625 requires the instantaneous code and Doppler rate of a given satellite signal as seen by the receiver in order to synchronize a local code generator to the code in the satellite signal. To determine the instantaneous code, the signal re-acquisition task uses the inertial position, in conjunction with the receiver clock offset and the known satellite position, to generate the theoretical pseudorange to the satellite. The GNSS sub-system then re-sets the local code generator to an appropriate code chip based on the theoretical pseudorange.

To determine theoretical Doppler rate, the signal re-acquisition task projects the inertial velocity onto the satellite line of sight vector and uses the resulting line of sight velocity in conjunction with the receiver clock offset and satellite motion to calculate the theoretical Doppler rate for the satellite. The theoretical Doppler rate is then used in the GNSS sub-system to set the Doppler controls for the local code generator.

The GNSS sub-system calculates the theoretical pseudoranges and Doppler rates for each observable satellite, in turn. Assuming the inertial position and velocity are close to the actual receiver position and velocity, the local code generator produces a code that is close in phase to the corresponding code in the received satellite signal. Thus, as soon as each satellite is available, the GNSS sub-system can quickly produce the correlation measurements that are used to determine GNSS position.

The GNSS sub-system must also resolve cycle ambiguities in order to determine the GNSS position relative to the fixed-position receiver. The GNSS sub-system first estimates the floating ambiguities associated with the RTK floating ambiguity filter 615. When the position is accurate as represented by the associated covariance, the GNSS sub-system initializes a search space for the RTK fixed ambiguity filter 620, and the fixed ambiguity resolution process can begin.

During the ambiguity estimation process, the GNSS sub-system uses the inertial position and associated covariance matrix to set the floating ambiguity position and covariance. The floating ambiguity estimation process normally takes up to 20 or 30 seconds to initialize a search space for the integer ambiguity filter, but the inertial aiding allows the initialization of the fixed ambiguity filter to start as soon as signals become available, thus shortening the resolution process considerably.

As discussed, the GNSS/INS uses separate but coupled GNSS and INS filters. Using separate GNSS and INS filters limits the size and complexities of the filters. Further, the separate calculation of GNSS positions and the de-weighting of certain measurements reduces the adverse effects of time-correlated errors in the GNSS information that is used to update the INS Kalman filter. Accordingly, the use of separate filters offers several advantages over using one filter. The benefits of the GNSS/INS receiver are also discussed in a provisional application from which this application claims priority and in a paper entitled "OEM4 Inertial: A Tightly Integrated Decentralized Inertial/GNSS Navigation System," by T. Ford, J. Neumann, P. Fenton, M. Bobye and J. Hamilton, that was presented at the 14th International Technical Meeting of the Satellite Division of the Institute of Navigation in Salt Lake City, September 2001, and is incorporated herein in its entirety by reference.

As noted above, the description contained herein comprises an exemplary embodiment of a GNSS/INS system. It is expressly noted that the principles of the present invention may be utilized with any system capable of providing real time location and navigation information for a heavy equipment vehicle. As such, the description contained herein should be taken as exemplary only.

Vision System

Referring back to FIG. 3, a vision system 355 is provided for obtaining location information of one or more targets 200, and thus, the working edge on which the target(s) reside, in accordance with an illustrative embodiment of the present invention. An image acquisition device, such as camera 110, obtains one or more images of a target 200 as the target moves through the fixed field of view 120 of the image acquisition device. Illustratively, the camera 110 obtains a plurality of images of the target every second. The images are conveyed to a vision processor 345 that executes software (not shown) for determining the location of the target in a vision system coordinate system, described further below. Illustratively, the vision processor 345 is operatively connected to the clock 335 so that acquired images may be time stamped to a common clock that is also utilized for the GNSS and INS measurements. This enables to vision system 355 to provide location information at a particular point in time that is synchronized with the GNSS/INS system. In one embodiment, the clock 335 operates as a master clock to which the GNNS, INS and vision systems are slaves.

As the target 200 is operatively connected to the working edge 105 in a known location, by determining the location of the target, the vision system identifies the location of the working edge within the vision system coordinate system. Thus, the vision system determines the position of, e.g., the bottom of the working edge based on the predefined spatial relationship between the target and a known location of the working edge. It should be noted that in alternative embodiments, the vision system may determine the position of a different location Illustratively, the image acquisition device 110 includes a fixed field of view 120 that encompasses the spatial region through which the target 200 may move during operation of the working edge 105. When the image acquisition device is installed on the heavy equipment vehicle, a calibration procedure is performed. The calibration procedure establishes a scale for the acquired images, i.e., a relationship between the known size of the target and the size, in image pixels, of the target in the image when the target is at a known position within the field of view. Illustratively, during the calibration procedure the working edge is placed in a known position, e.g., a neutral position of the working edge. This permits the calibration procedure to establish a baseline as to scale and location of the target within the field of view. By establishing the baseline using a known location, when the target is moved during operation, the identified location of the target may be calculated as an offset from the established baseline. Thus, when the target is later located within an image as being higher than it was during the calibration, the vision system may determine that the working edge has been raised. Using the relationship between pixel size and a predefined size within the field of view, the vision system may also determine how far the target has moved. Similarly, the system may determine angles of rotation during the calibration based on a predetermined rotation of the working edge and a measured skew of the target in the image.

During operation, the image acquisition device 110 obtains a plurality of images of its field of view. The vision processor 345 then locates the target within each image. As the field of view of the camera is fixed, the vision processor 345 may determine the location of the target and thus the working edge within the vision system coordinate system by identifying the location of the target in the images. For example, if the working edge is raised, then the location of the target within the field of view, i.e., within the image, will be raised. Similarly, if the working edge is moved left or right, the location of the target within the field of view is correspondingly shifted.

Should the working edge rotate, the attached target will also rotate and appear skewed within the acquired image. The vision processor can determine the angle of rotation by analyzing the skew of the target in the images. As will be appreciated by one skilled in the art, the squares of the target will appear to be elongated as the target is rotated from the perspective of the image acquisition device. By measuring the skew of the target in the image, the vision system may determine the angle of rotation of the target in the vision system coordinate system and a corresponding rotation of the working edge.

The vision system outputs a set of working edge location information. When combined with the navigation information provided by the navigation system, a working edge control system 350 may first transform the working edge location from the vision system coordinate system into the navigation system's coordinate system. This provides a location of the working edge in a coordinate system that may be utilized by the working edge control system to control the operation of the working edge.

Working Edge Control

Figure 7:
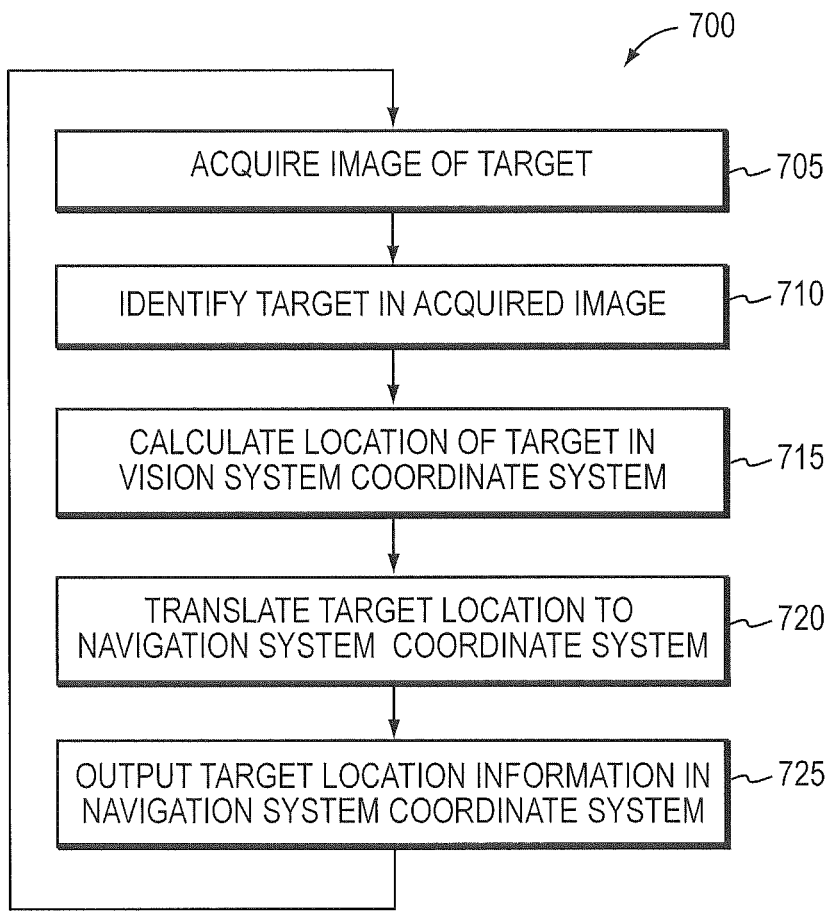
FIG. 7 is a flow chart detailing the steps of a procedure for determining the location of a working edge in accordance with an illustrative embodiment of the present invention.

FIG. 7 is a flowchart detailing the steps of a procedure 700 for providing location information relating to a working edge, such as a blade 105, in accordance with an illustrative embodiment of the present invention. The procedure 700 begins in step 705 where an image of the target is acquired by the image acquisition device. Illustratively, the image acquisition device comprises a video camera that acquires a plurality of images per second. The vision processor analyzes the captured image and identifies the target within the image in step 710. Illustratively, the captured images are time tagged with the time of the clock 335 so that the location information generated by the vision system 355 can be combined with the navigation information from the GNSS/INS systems, which are similarly time tagged.

As noted above, the target is of a predefined pattern that may be located using conventional machine vision algorithms. In one illustrative embodiment, the vision system begins looking for the target in the same location as the location of the target in the previous time tagged image. As a plurality of images are typically acquired each second, the target is not likely to move substantially between acquired images. In an alternative embodiment, the vision system may perform a scan of the entire acquired image to identify the target within the image. As will be appreciated by one skilled in the art, various well known known techniques may be utilized to identify the target in the acquired image. As such, the techniques described herein should be taken as exemplary only.

Once the target has been identified within the acquired image, the procedure then in step 715, calculates the location of the target within the vision system's coordinate system. This calculation may be performed using conventional algorithms to identify a location of an object within an image using a camera based coordinate system. Generally, as the image acquisition device has a fixed field of view, the vision processor may calculate the location of the target within the corresponding coordinate system by identifying the relative position of target within the fixed field of view. If the target is higher within the field of view by a given number of pixels, then the target has been raised by, e.g., the working edge being raised a corresponding number of centimeters based on the scale of the images as determined during calibration. Thus, as the target is moved within the field of view, the vision system may calculate the relative position of the target within the vision system's coordinate system at a particular point in time and time tag the information using the same time that is used to time tag the GNSS and INS measurements.

At the conclusion of step 715, the vision processor 345 has calculated the location of the target within the vision system's coordinate system. That is, the vision processor 345 has an X,Y,Z location with respect to the origin of the vision system's coordinate system as well as rotation information relating to the target. As the navigation system has location information for the heavy equipment vehicle in a navigation system coordinate system that corresponds to the real world, the target location information needs to be converted into the navigation system coordinate system. In step 720 the working edge control system 350 translates the target location from the vision system's coordinate system to the navigation system's coordinate system.

When the vision system is first installed, a calibration procedure occurs that identifies the location of the origin of the vision system's coordinate system at a specific point within the navigation system's coordinate system. Using this known location, a transformation may be calculated to translate the origin point of the vision system's coordinate system to the navigation system's coordinate system. Illustratively, the working edge control system 350 utilizes the navigation information obtained from the navigation system 300, the relative location information of the target obtained from the vision system 355 and the calculated transformation value as inputs to generate the location of the target in the navigation system's coordinate system.

In an exemplary embodiment, the spatial relationship between the location of the target and a known point of the working edge may be utilized for a second transformation so that the location information relates to the predefined point on the working edge and not the target. The use of the predefined spatial relationship may occur within the vision system, so that the vision system outputs the location of the predefined point on the working edge in the vision system coordinate system instead of the location of the target. Alternatively, the predefined spatial relationship may be utilized during the transformation into the navigation system's coordinate system. In a further alternative embodiment, the working edge control system may make a further transformation after receiving the target's location in the navigation system's coordinate system. As will be appreciated by those skilled in the art, the timing of when the spatial relationship is taken into account may occur at various points during the procedure 700. As such, the description of it occurring at a particular point in time should be taken as exemplary only.

The target location in the navigation system's coordinate system is then output in step 725. Illustratively, the working edge control system 350 may output the target location to an appropriate control mechanism to, e.g., maneuver the blade into a pre-programmed position. For example, if the working edge control system determines from the target location that the blade 105 is too high, i.e., that not enough of the dirt or other material is being removed, the blade control system may automatically lower the blade to a level that is closer to the elevation of the ground, such that the proper amount of dirt or other material is removed while the bulldozer is moving along a particular path. The procedure 700 then loops back to step 705.

The foregoing description has been directed to specific embodiments of this invention. It will be apparent, however, that other variations and modifications may be made to the described embodiments, with the attainment of some or all of their advantages. It is expressly contemplated that the procedures, processes, and methods described herein may be implemented in alternative orders. Furthermore, the teachings of this invention can be implemented as software (including a computer-readable medium having program instructions executing on a computer), hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system for controlling a working edge on a vehicle, the system comprising:
a navigation system configured to provide a location of the vehicle in a navigation system coordinate system, wherein the navigation system further comprises a GNSS sub-system operatively interconnected with an inertial navigation sub-system, wherein the GNSS sub-system and the inertial navigation system are synchronized to a common clock;
an image capture device with a fixed field of view configured to obtain one or more images of one or more targets operatively connected to the working edge;
a vision system configured to determine location information, in a vision system coordinate system, of the working edge using the captured one or more images by determining relative locations of the one or more targets in the one or more images, wherein the captured one or more images are time stamped to the common clock; and
a processor configured to translate the location information from the vision system coordinate system to the navigation system coordinate system.

2. The system of claim 1 wherein the processor translates the location information using a predefined transformation between the vision system coordinate system and the navigation system coordinate system.

3. The system of claim 1 further comprising a working edge control system configured to utilize the location information in the navigation system coordinate system to control the working edge to obtain a preconfigured result.

4. The system of claim 1 wherein a predefined spatial relationship exists between the target and the working edge.

5. The system of claim 4 wherein the processor is further configured to perform a transformation associated with the predefined spatial relationship when transforming the location information from the vision system coordinate system to the navigation system coordinate system comprises.

6. A method for controlling a working edge on a vehicle, the method comprising:
determining, using a global positioning sub-system and an inertial navigation sub-system, a location of the vehicle in a navigation system coordinate system, wherein the global positioning sub-system and the inertial navigation sub-system utilize a common clock;
obtaining one or more images of one or more targets operatively connected to the working edge using a camera with a fixed field of view, wherein the one or more images are time stamped to the common clock;
determining location information, in a vision system coordinate system, of the working edge using the captured one or more images of the one or more targets; and
transforming the location information from the vision system coordinate system to the navigation system coordinate system.

7. The method of claim 6 further comprising:
calculating a transformation between the navigation system coordinate system and the vision system coordinate system.

8. The method of claim 7 wherein the calculated transformation is utilized to transform the location information from the vision system coordinate system to the navigation system coordinate system.

9. The method of claim 6 further comprising using the location information in the navigation system coordinate system to operate a working edge to obtain a preconfigured result.

10. The method of claim 6 wherein a predefined spatial relationship exists between the target and the working edge.

11. The method of claim 10 wherein transforming the location information from the vision system coordinate system to the navigation system coordinate system comprises using a transformation associated with the predefined spatial relationship.

12. A system comprising:
a vehicle having a working edge, the vehicle comprising a navigation system, an image capture device, a vision system and a processor;
wherein the navigation system comprises a global position sub-system and an inertial navigation sub-system, the navigation system configured to provide a location of the vehicle in a navigation system coordinate system, wherein the global position sub-system and the inertial navigation sub-system utilize a common clock;

wherein the image capture device is configured to obtain one or more images of one or more targets operatively connected to the working edge using a fixed field of view relative to the one or more targets, wherein the one or more images are time stamped using the common clock;

wherein the vision system is configured to determine location information, in a vision system coordinate system, of the working edge using the relative locations of the one or more targets in the captured one or more images of the one or more targets; and wherein the processor is configured to translate the location information from the vision system coordinate system to the navigation system coordinate system using a predefined transformation between the vision system coordinate system and the navigation system coordinate system and a predefined spatial relationship between the target and a predefined point on the working edge.

* * * * *